(12) United States Patent
Hutchison

(10) Patent No.: US 10,391,576 B2
(45) Date of Patent: Aug. 27, 2019

(54) CALCULATING OUTPUT INDUCTANCE OF A WELD SECONDARY

(71) Applicant: ILLINOIS TOOL WORKS INC., Glenview, IL (US)

(72) Inventor: Richard M. Hutchison, Iola, WI (US)

(73) Assignee: Illinois Tool Works Inc., Glenview, IL (US)

( * ) Notice: Subject to any disclaimer, the term of this patent is extended or adjusted under 35 U.S.C. 154(b) by 147 days.

(21) Appl. No.: 15/357,530

(22) Filed: Nov. 21, 2016

(65) Prior Publication Data

US 2018/0141149 A1 May 24, 2018

(51) Int. Cl.
| | |
|---|---|
| *G06F 19/00* | (2018.01) |
| *B23K 9/10* | (2006.01) |
| *B23K 9/095* | (2006.01) |
| *G05B 19/042* | (2006.01) |

(52) U.S. Cl.
CPC .......... *B23K 9/1062* (2013.01); *B23K 9/0953* (2013.01); *B23K 9/0956* (2013.01); *B23K 9/1006* (2013.01); *G05B 19/042* (2013.01); *G05B 2219/45135* (2013.01)

(58) Field of Classification Search
CPC .. B23K 9/0953; B23K 9/0956; B23K 9/1006; B23K 9/1062; G05B 19/042; G05B 2219/45135
See application file for complete search history.

(56) References Cited

U.S. PATENT DOCUMENTS

| | | | | | |
|---|---|---|---|---|---|
| 4,711,986 | A | * | 12/1987 | Lillquist | B23K 9/296 219/130.01 |
| 6,469,276 | B1 | * | 10/2002 | Renner | B23K 9/1006 219/130.21 |
| 6,498,321 | B1 | * | 12/2002 | Fulmer | B23K 9/1056 219/130.33 |
| 8,546,726 | B2 | | 10/2013 | Vogel | |
| 9,492,880 | B2 | * | 11/2016 | Vogel | H02M 3/157 |

(Continued)

FOREIGN PATENT DOCUMENTS

| | | |
|---|---|---|
| JP | 4334161 | 11/2002 |
| JP | 2012095442 | 5/2012 |
| WO | 2016050627 | 4/2016 |

OTHER PUBLICATIONS

Int'l Search Report and Written Opinion for PCT/US2017/061789 dated Apr. 5, 2018 (12 pgs).

*Primary Examiner* — Kidest Bahta
(74) *Attorney, Agent, or Firm* — McAndrews, Held & Malloy, Ltd.

(57) ABSTRACT

A welding-type system includes a welding-type power supply to output welding-type power, and a controller connected to the welding-type power supply. The controller is configured to set a value of a control variable of a control loop of the welding-type power supply, the control loop controlling the welding-type power. The controller is also configured to adjust the value of the control variable while monitoring the control loop. In response to detecting oscillation in the control loop, the controller is configured to determine a weld circuit inductance associated with a weld circuit of the welding-type system based on a relationship between the adjusted control variable value and the weld circuit inductance.

17 Claims, 4 Drawing Sheets

(56) References Cited

U.S. PATENT DOCUMENTS

| | | | |
|---|---|---|---|
| 2002/0190043 A1* | 12/2002 | Rice | B23K 9/073 |
| | | | 219/130.31 |
| 2003/0062351 A1* | 4/2003 | Davidson | B23K 9/1006 |
| | | | 219/130.5 |
| 2006/0108343 A1* | 5/2006 | Schwartz | B23K 9/10 |
| | | | 219/130.33 |
| 2007/0030612 A1* | 2/2007 | Kamath | B23K 10/00 |
| | | | 361/82 |
| 2008/0296376 A1* | 12/2008 | Kim | G06K 7/0047 |
| | | | 235/435 |
| 2010/0089889 A1 | 4/2010 | Hutchinson | |
| 2013/0256290 A1 | 10/2013 | Vogel | |
| 2015/0283652 A1 | 10/2015 | Pfeifer et al. | |

\* cited by examiner

CALCULATING OUTPUT INDUCTANCE OF A WELD SECONDARY

BACKGROUND

Welding is a process that has become ubiquitous in various industries and applications, such as construction, ship building, and so forth. Welding systems typically include a variety of secondary components, which may include secondary cabling as well as secondary equipment, and certain parameters of these secondary components may impact the quality of the weld obtained in a welding operation. For instance, certain work environments may position a welding location or workpiece large distances from a welding power source. An inductance realized in a secondary component (e.g., a weld power cable) can adversely affect the operation of the welding system. Thus, a system to calculate and mitigate such secondary inductance is desirable.

SUMMARY

Methods and systems are provided for calculating output inductance of a weld secondary, substantially as illustrated by and described in connection with at least one of the figures, as set forth more completely in the claims.

DETAILED DESCRIPTION

Figure 1:
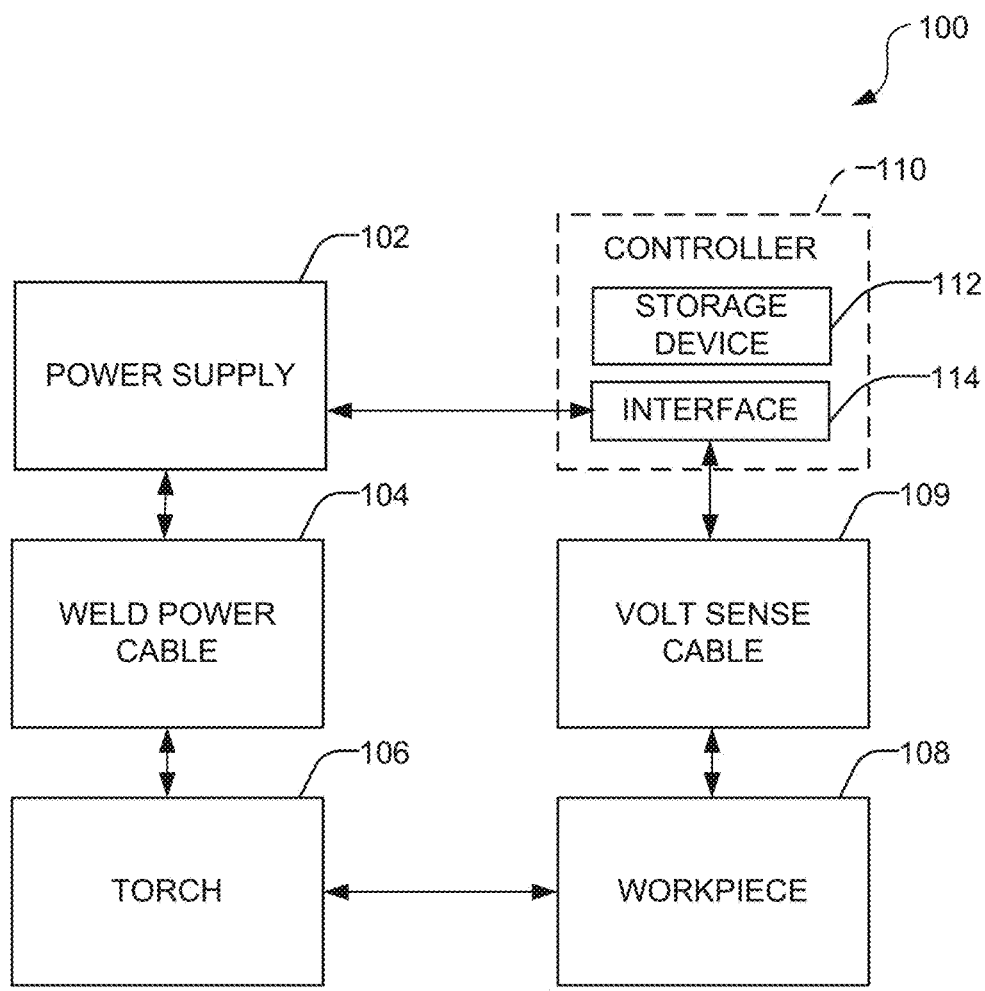
FIG. 1 is a block diagram of an example implementation of a welding system in accordance with aspects of this disclosure.

Methods and systems are provided for calculating output inductance of a secondary weld cable configuration in a welding-type environment. Welding systems are configurable such that user controls (e.g., software, hardware, or a combination of software and hardware) control voltage control loop variables (e.g., gain and/or feedback length) over a range of values, and employ the variables to calculate an output inductance of a secondary component (e.g., a weld cable). Information regarding the inductance of the secondary component can be significant in controlling welding processes, for example, in maintaining a suitable weld voltage at a welding-type torch in a welding-type environment.

Conventional systems determine the secondary inductance of a welding system by relying upon measurements of voltage change during a step-change in the weld current during operation of the welding system.

Disclosed examples employ a method (e.g., a computer controlled algorithm) to calibrate the system in a work environment. A voltage-controlled (e.g., constant voltage, or CV) process can be selected (e.g., a short arc or "Accupulse" type process) and a proportional gain of the voltage-controlled system can be increased until a control loop begins to oscillate in response. The system can identify a gain value at which the oscillation begins and compare the gain value to a list of gain values that correspond to a list of inductance values (e.g., calculated from previous, controlled tests) to determine an inductance value that correlates to the identified gain value.

Disclosed examples employ another method to calibrate the system in a work environment. In this example, the proportional gain is fixed and a proportional filter length is reduced until oscillations began. Once identified, a filter length value is compared against a list of filter lengths that correspond to a list of known inductance values to determine an inductance value that correlates to the identified filter length value.

Disclosed examples employ a combination of the gain and filter length values to identify an inductance value.

Disclosed example welding-type systems include a welding-type power supply to output welding-type power, and a controller connected to the welding-type power supply. The controller is configured to set a value of a control variable of a control loop of the welding-type power supply, the control loop controlling the welding-type power. The controller is also configured to adjust the value of the control variable while monitoring the control loop. In response to detecting oscillation in the control loop, the controller is configured to determine a weld circuit inductance associated with a weld circuit of the welding-type system based on a relationship between the adjusted control variable value and the weld circuit inductance.

In some examples, the control variable includes at least one of a proportional gain or a proportional filter length. In some examples, the control variable is set at a predetermined value of the proportional gain, and the controller is configured to increase the value of the proportional gain until the oscillation is detected in the control loop. In some examples, the controller is also configured to adjust the proportional gain to an optimized level between minimum and maximum proportional gain values. In some examples, the welding-type system includes a storage device storing a look up table that includes a list of proportional gain values and corresponding inductance values.

In some examples, the controller is further configured to compare the proportional gain value corresponding to the detected oscillation to the list of proportional gain values, determine a proportional gain value in the list of proportional gain values that substantially matches the proportional gain value corresponding to the detected oscillation, and identify an inductance value corresponding to the proportional gain value as the secondary inductance of the weld circuit.

In some examples, the control circuit is configured to interpolate an inductance value based on two inductance values associated with corresponding proportional gain values in the list of proportional gain values, the corresponding proportional gain values selected based on the value of the proportional gain when the oscillation is detected. In some examples, the control variable is set at a predetermined value of the proportional filter length, the control circuit further configured to decrease the value of the filter length until the oscillation is detected in the voltage control loop.

In some examples, the controller is configured to calculate an error value based on a comparison of a feedback voltage to a predetermined reference voltage, and determine a proportional change in the value of the control variable based on the error value. In some examples, the controller is configured to set a minimum value and a maximum value for the proportional change to reduce the oscillation in the voltage control loop. In some examples, the controller includes a filter configured to filter the feedback voltage to increase a signal to noise ratio. In some examples, the filter is configured to collect a number of feedback voltage samples, and calculate an average value of the feedback voltage samples. In some examples, the control loop is one of a voltage control loop and a current control loop.

Welding-type power, as used herein, refers to power suitable for welding, plasma cutting, induction heating, air carbon-arc cutting and/or gouging (CAC-A), cladding, and/or hot wire welding/preheating (including laser welding and laser cladding), including inverters, converters, choppers, resonant power supplies, quasi-resonant power supplies, etc., as well as control circuitry and other ancillary circuitry associated therewith.

In an example, output inductance is demonstrated by the behavior of a cable (e.g., a coiled cable) in resisting a change of electric current through the cable. The inductance may be defined in terms of the electromotive force generated to oppose a change in current within the cable. When a change of current is experienced in a secondary welding component like a cable, the voltage can vary from output at the power supply to the torch, resulting in an uncontrolled weld output. The present disclosure provides systems and methods that determine the inductance of the cable, which allows the system to mitigate negative impacts from inductance introduced in the weld power cables, as described in detail with respect to the figures.

FIG. 1 illustrates an example welding-type system 100 suitable for powering welding operations. The welding-type system 100 includes a welding-type power supply 102, a device, such as welding type torch 106, a weld power cable 104, and a controller 110. The system 100 can also include a workpiece 108 and a volt sensing cable 109 to create a circuit, as shown in FIG. 1. The welding torch 104 may be a torch configured for stick welding, tungsten inert gas (TIG) welding, metal inert gas (MIG), gas metal arc welding (GMAW), or other torch types, based on the desired welding application. The system 100 may be coupled to other devices, such as a wire feeder, an induction heater, a plasma cutter, a power generator, or any combination thereof. The inductance of the weld power cable 104 may affect the power output provided from the power supply 102 to the device. As discussed below, the system 100 is configured to determine the inductance of the weld power cables 104, as well as the secondary device.

The example controller 110 of FIG. 1 controls the operations of the system 100 and may be a general-purpose computer, a laptop computer, a tablet computer, a mobile device, a server, and/or any other type of computing device integrated or remote to the system 100. In some examples, the controller 110 is implemented in a cloud computing environment, on one or more physical machines, and/or on one or more virtual machines. The controller 110 is in communication with one or more interfaces 114, for example, an operator interface, a network interface, and an interface with a storage device 112.

The controller 110 may receive input from the one or more interfaces 114 through which the welding type system receives commands from, for example, an operator (e.g., a welder). In some examples, the operator may employ one or more interfaces 114 to choose a welding process (e.g., stick, TIG, MIG, etc.) and desired parameters of the input power (e.g., voltages, currents, etc.). The controller 110 may be configured to receive and process a plurality of inputs regarding the performance and demands of the system 100.

The storage device 112 may include volatile or non-volatile memory, such as ROM, RAM, magnetic storage memory, optical storage memory, or a combination thereof, and may be integrated with the controller 110, located remotely, or a combination of the two. In addition, a variety of control parameters may be stored in the storage device 112 along with code configured to provide a specific output during operation.

In a working environment, secondary components, such as the torch 106, are connected to the power supply 102 by the weld power cable 104 which can vary in length and introduce a secondary inductance. The controller 110 executes a process employing one or more variables to determine an induction of the secondary component (e.g., the weld power cable 104). The controller 110 compares the one or more variables against a list of values stored in the storage device 112, which can then be used to adjust a welding parameter to ensure proper operation of the system 100. For example, the controller 110 may utilize a look up table, an algorithm, and/or a model stored in the storage device 112 to determine the inductance of the weld power cable 104 based on a relationship between the variables and the values stored in memory. The controller 110 can then adjust a characteristic of the system 102 (e.g., an output) to mitigate effects of the inductance.

In an example, the system 100 is rated with a power output range, and has an acceptable inductance range associated with welding-type operations. The welding-type torch 106 may be located a distance from the welding power supply 102 and connected by the weld power cable 104. For example, the welding power supply 102 may be in a different building, structure, or room than the power supply 102. The inductance may vary during use as the weld power cables 104 are coiled, extended, and/or moved. Properties that affect the inductance of a weld power cable 104 may include length of the weld power cable 104, material of conductors within the weld power cable 104, disposition of the weld power cable 104 (e.g., coiled, straight), disposition relative to conductive materials (e.g., coiled around a rod), arrangement (e.g., parallel, twisted) relative to other weld power cables, and proximity to inductive sources (e.g., other weld power cables).

The addition of the secondary inductance can cause disparities in the weld voltage between the torch 106 and the workpiece 108. In an example process to maintain a given variable and/or parameter at a pre-determined, pre-set level, the controller 110 utilizes a control loop. In the control loop, the variable to be maintained at the pre-set level is constantly monitored (e.g., sampled, measured, etc.) and compared to a desired level. This monitoring is termed feedback. Differences, for example, positive or negative changes, revealed during the comparison between the desired level and the actual (i.e. instantaneous) feedback are determined as an error. The system and methods described herein employ the measured and determined variables and/or parameters to maintain the system operation at a pre-set level.

In an example MIG welding system, the variable to maintain at a pre-set level can be a process voltage. Real-time voltage is measured and sampled at a predetermined rate in order to receive a suitable feedback signal. For example, the system 100 can sample the voltage 50,000 times per second, equating to 20 μsec between samples. Each time a sample of the voltage is taken, a calculation is performed to determine the error, as shown in equation 1:

$$\varepsilon = (V_{set} - V_{fbk}) \qquad \text{Equation 1}$$

Once an error term is calculated, the error is employed to restore the voltage to a predetermined value. In an example, the error is positive, indicating that the actual, instantaneous voltage is less than the predetermined value. Thus, the controller 110 adjusts the voltage to increase the process voltage of the system 100 (e.g., the voltage at the welding-type torch 106). In other examples welding systems, the control variable is a welding current.

A direct relationship exists between arc voltage and arc current in a constant wire-feed speed (WFS) MIG process. Increasing the arc current by a certain amount will therefore directly increase the process voltage. In other words, when the error term is positive, the controller 110 increases the control variable (e.g., current and/or voltage) in order to raise the actual voltage to a value closer to the desired value, thereby reducing the error term.

In order to determine by what magnitude the current is to be increased to get the voltage to the desired value, the controller 110 adjusts the current proportionally to the magnitude of the error term. This is expressed mathematically, in Equation 2 as follows:

$$I_{command} = I_{nominal} + \varepsilon \cdot P_{gain} \qquad \text{Equation 2}$$

In Equation 2, $I_{command}$ is the current command sent to the power source, $I_{nominal}$ is the average current level expected for the given WFS (wire feed speed), $\varepsilon$ is the voltage error term calculated from Equation 1, $P_{gain}$ is the gain value for the proportional control that determines how many amps/volt change to produce for a given voltage error ($P_{gain}$ is represented by parameters "Arc Proportional Gain" for the arc phase and "Short Proportional Gain" for the short phase). The allowable range of these parameters lies between the "P-gain Min" and "P-gain Max" parameter settings.

Since sampling of the voltage feedback is done at a high rate (e.g., 50,000 times per second) it is not necessary or beneficial to adjust current in response to each sample. Moreover, in an electromagnetically noisy environment, random noise signals can be superimposed on the measured process voltage feedback. Overreacting to such noise would adversely affect the process stability. To avoid unnecessary adjustment, the controller 110 filters the $V_{fbk}$ signal. In this manner, the controller 110 can perform a running average of the $V_{fbk}$ samples over a predetermined number of samples.

Figure 2:
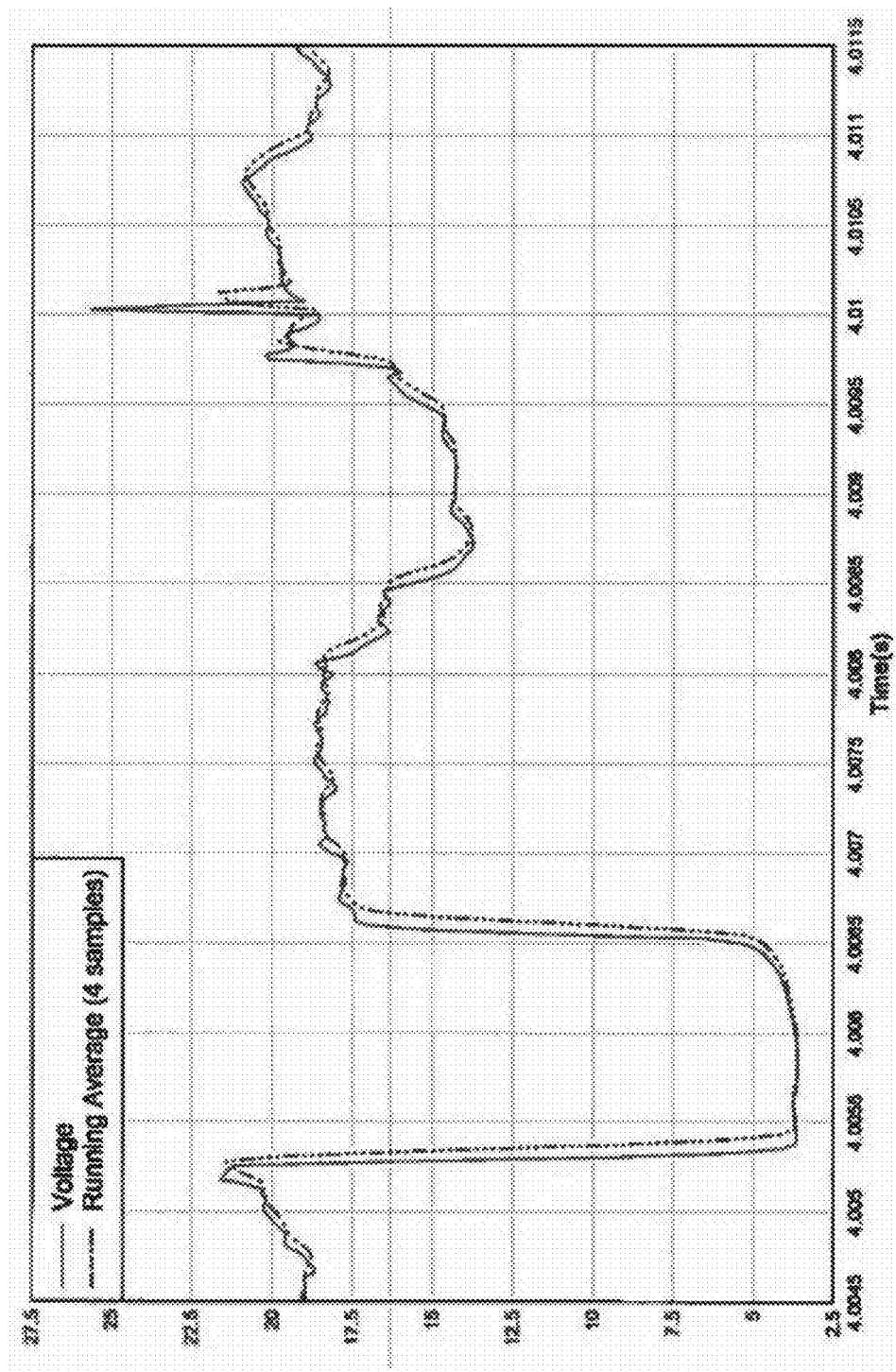
FIG. 2 is a graphical diagram of experimental data from an implementation of the welding system of FIG. 1, in accordance with aspects of this disclosure.

FIG. 2 illustrates a solid line as a voltage waveform from a weld operation and a dashed line is the same data generated from a running average of 4 sampled data points. The noise spike at about 4.01 seconds is significantly reduced in amplitude by the filter so that the corresponding change to the current command will be less, thereby ensuring adjustments are made deliberately within a suitable timeframe.

Setting the proportional filter requires more than selecting a number of data points to include in the running average. The proportional filter does not react directly to the voltage feedback signal values; rather the proportional filter is used to filter the error between the $V_{set}$ and $V_{fbk}$ values. As explained above, each time a voltage sample is taken, an error term is calculated, as shown in Equation 3:

$$\varepsilon_i = (V_{set_i} - V_{fbk_i}) \qquad \text{Equation 3}$$

As shown in Equation 3, the "i" subscript identifies the most recently acquired $V_{fbk}$ sample. To achieve filtering of the error, a running average of a predetermined number of values of the error term is calculated. This running average is the sum of the last N values of the error term divided by N. Equation 4 shows an example when N=4:

$$\varepsilon_{p\_avg} = \frac{\varepsilon_{i-3} + \varepsilon_{i-2} + \varepsilon_{i-1} + \varepsilon_i}{N} \qquad \text{Equation 4}$$

To avoid storing each of the last sample in memory for a very long sampling, and thereby reducing the amount of computational power dedicated to calculating the error, a portion of the present value of the $\varepsilon_{sum}$ is determined based on the size of the filter length N. Using the example of Equation 4 (e.g., N=4), the processor would first subtract off ¼ of the previous value of $\varepsilon_{Psum}$ from itself. In essence, the number of error samples has been reduced by 25%. Then, the same percentage of the current error term $\varepsilon_i$ is added back into $\varepsilon_{Psum_{new}}$. In this way, the results of the running average calculation are substantially reproduced and the computations are greatly simplified.

Figure 3:
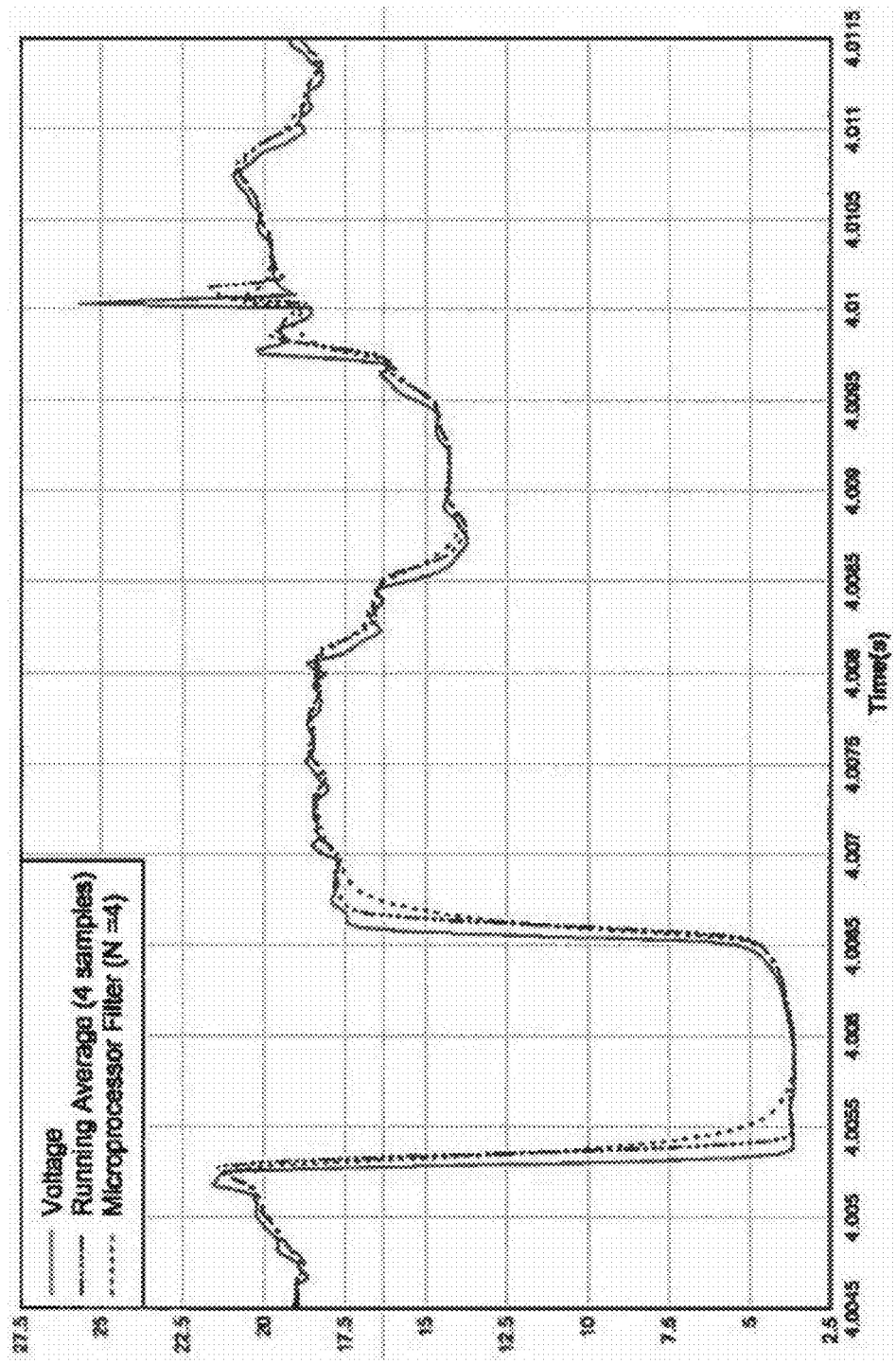
FIG. 3 is another graphical diagram of experimental data from an implementation of the welding system of FIG. 1, in accordance with aspects of this disclosure.

FIG. 3 illustrates the same section of the voltage waveform shown in FIG. 2 with the running average filter and the digital filtering method used by the controller 110. In FIG. 3, the proportional filter can be within the range of 0-16384. To achieve a filter value of N so that 1/N of the $\varepsilon_{Psum_{old}}$ is subtracted and 1/N of the $\varepsilon_i$ is added each time the proportional error is recalculated, the conversion from Equation 5 applies:

$$\frac{1}{N} = \frac{PropFilterValue}{16384} \qquad \text{Equation 5}$$

Equation 6 provides a filter value for a desired filter length of 4:

$$PropFilterValue = \frac{16384}{4} = 4096 \qquad \text{Equation 6}$$

In order to increase the filter number, the controller 110 decreases the value of the proportional filter. One thing that is observed from the filtered curves in FIGS. 2 and 3 is that the filtering introduces a delay in the voltage signal when a large step change occurs in the feedback variable. This phenomenon is more pronounced as the filter length increases.

Figure 4:
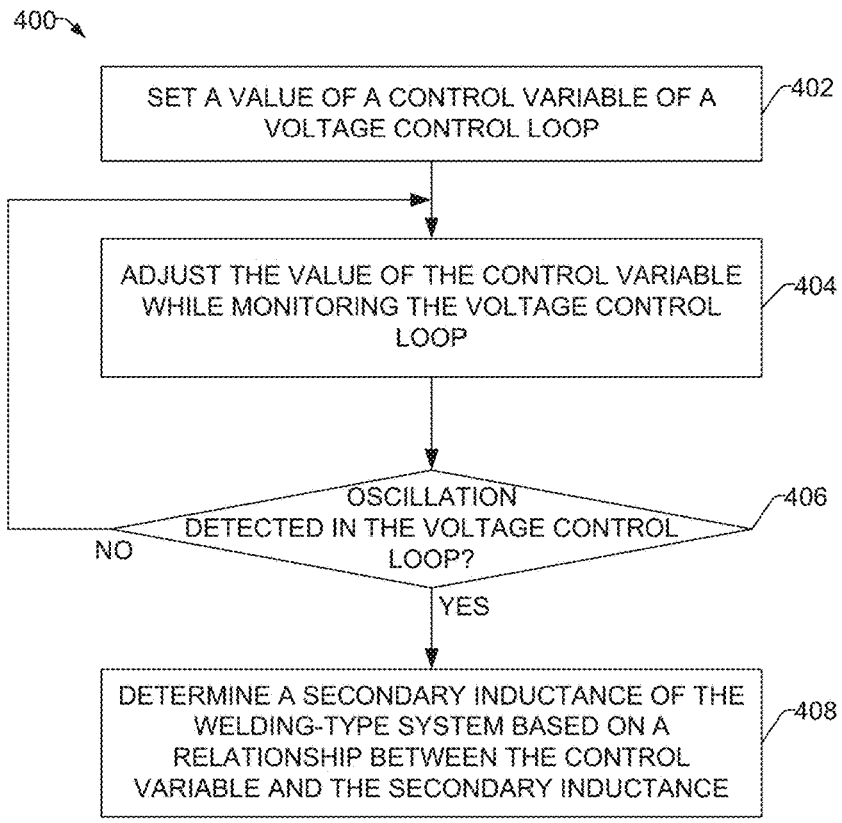
FIG. 4 is a flowchart illustrating example machine readable instructions which may be executed by a processor to implement the controller of FIG. 1 to determine a secondary inductance of a welding-type system.

FIG. 4 is a flowchart illustrating example machine readable instructions 400 which may be executed by a processor (e.g., controller 110 of FIG. 1) to calculate output inductance of a weld secondary (e.g., from weld power cables 104) between a power supply (e.g., power supply 102) and a device (e.g., torch 106) of a welding-type system (e.g., system 100). The example instructions 400 may be stored on the any suitable non-transitory machine readable media, such as storage device 112 described with respect to FIG. 1. At block 402, the controller sets a value of a control variable of a voltage control loop, with the control variable including a proportional gain and/or a proportional filter length. At block 404, the controller adjusts the value of the control variable while monitoring the voltage control loop. For example, the controller can increase the value of the proportional gain until the oscillation is detected in the voltage control loop. At block 406, the controller determines whether an oscillation is detected in the voltage control loop. If no oscillation is detected, the controller continues to monitor the voltage control loop, and returns to block 404. If oscillation is detected in the voltage control loop, the controller continues to block 408.

At block 408, the controller determines a secondary inductance of the welding-type system based on a relationship between the control variable and the secondary inductance in response to detecting oscillation in the voltage control loop. For example, the controller 110 is configured to access a storage device storing a look up table that includes a list of proportional gain values and corresponding inductance values. The controller 110 is further configured to compare an increased value of the proportional gain to the list of proportional gain values and, based on the comparison, the controller 110 is configured to determine a proportional gain value in the list of proportional gain values that substantially matches the increased value of the proportional gain, as well as identify an inductance value corresponding to the proportional gain value as the secondary inductance of the welding-type system. In response, the controller 110 is configured to set a minimum value and a maximum value for a proportional change to reduce oscillation in the voltage control loop. For example, the controller can adjust a current of the welding-type power proportional to the increase in the value of the proportional gain.

In some examples, the controller 110 determines whether the inductance value is greater than a threshold inductance. The threshold inductance may be a value input by the user and/or a value stored in a memory. For example, the device may be configured to reduce or eliminate the effects of the secondary inductance when the inductance value is less than the threshold inductance value. If the secondary inductance is greater than the threshold inductance value, the welding system 100 may signal (e.g., via a display, sound, light, etc.) that the determined inductance of the weld cables 108 is greater than the threshold inductance.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
   a welding-type power supply to output welding-type power;
   a controller connected to the welding-type power supply configured to:
   set a value of a control variable of a control loop of the welding-type power supply, the control loop controlling the welding-type power;
   adjust the value of the control variable while monitoring the control loop; and
   in response to detecting oscillation in the control loop, compare the control variable value corresponding to the detected oscillation to a list of control variable values;
   determine a control variable value in the list of control variable values that matches the control variable value corresponding to the detected oscillation; and
   identify an inductance value corresponding to the control variable value as a weld circuit inductance associated with a weld circuit of the welding-type system based on the comparison.

2. The welding-type system as defined in claim 1, wherein the control variable comprises at least one of a proportional gain or a proportional filter length.

3. The welding-type system as defined in claim 2, wherein the control variable is set at a predetermined value of the proportional gain, the controller configured to increase the value of the proportional gain until the oscillation is detected in the control loop.

4. The welding-type system as defined in claim 3, the controller further configured to adjust the proportional gain to an optimized level between a set minimum proportional gain value and a set maximum proportional gain value.

5. The welding-type system as defined in claim 3, further comprising a storage device storing a look up table that includes a list of proportional gain values and corresponding inductance values.

6. The welding-type system as defined in claim 5, wherein the control circuit is configured to interpolate an inductance value based on two inductance values associated with corresponding proportional gain values in the list of proportional gain values, the corresponding proportional gain values selected based on the value of the proportional gain when the oscillation is detected.

7. The welding-type system as defined in claim 2, wherein the control variable is set at a predetermined value of the proportional filter length, the control circuit further configured to decrease the value of the filter length until the oscillation is detected in the voltage control loop.

8. The welding-type system as defined in claim 1, wherein the controller is configured to:
    calculate an error value based on a comparison of a feedback voltage to a predetermined reference voltage; and
    determine a proportional change in the value of the control variable based on the error value.

9. The welding-type system as defined in claim 8, wherein the controller is configured to set a minimum value and a maximum value for the proportional change to reduce the oscillation in the voltage control loop.

10. The welding-type system as defined in claim 8, wherein the filter is configured to:
    collect a number of feedback voltage samples; and
    calculate an average value of the feedback voltage samples.

11. The welding-type system as defined in claim 1, wherein the control loop is a voltage control loop.

12. The welding-type system as defined in claim 1, wherein the control loop is a current control loop.

13. A non-transitory machine readable storage device comprising machine readable instructions which, when executed, cause a controller to:
    set a value of a control variable of a control loop of a welding-type power supply in a welding-type system, wherein the control variable is set at a predetermined value of a proportional gain, the instructions to cause the controller to;
    adjust the value of the proportional gain while monitoring the control loop until oscillation is detected in the control loop;
    decrease the value of the proportional gain until the oscillation is no longer detected in the control loop; and
    determine a secondary inductance of the welding-type system based on a relationship between the proportional gain and the secondary inductance in response to no longer detecting oscillation in the control loop.

14. The non-transitory machine readable storage device as defined in claim 13, wherein the instructions to cause the controller to increase the value of the proportional gain until the oscillation is detected in the control loop.

15. The non-transitory machine readable storage device as defined in claim 14, wherein the instructions, when executed, cause the controller to adjust a current of the welding-type power proportional to the increase in the value of the proportional gain.

16. The non-transitory machine readable storage device as defined in claim 15, wherein the instructions, when executed, cause the controller to access a second storage device storing a look up table that includes a list of proportional gain values and corresponding inductance values.

17. The non-transitory machine readable storage device as defined in claim 16, wherein the instructions, when executed, cause the controller to:
    compare an increased value of the proportional gain to the list of proportional gain values;
    determine a proportional gain value in the list of proportional gain values that matches the increased value of the proportional gain; and
    identify an inductance value corresponding to the proportional gain value as the secondary inductance of the welding-type system.

* * * * *